B. O. GAGE.
TOOL HOLDER FOR ROTARY DRILLING AND LIKE MACHINES.
APPLICATION FILED JAN. 19, 1914.
1,131,777.
Patented Mar. 16, 1915.
2 SHEETS—SHEET 2.
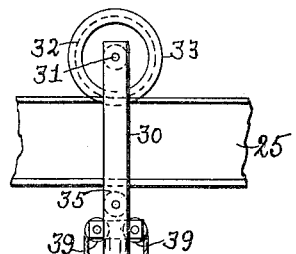
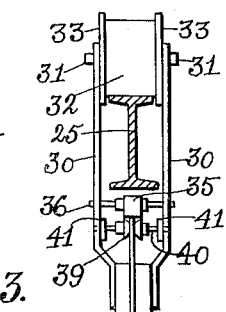
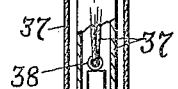
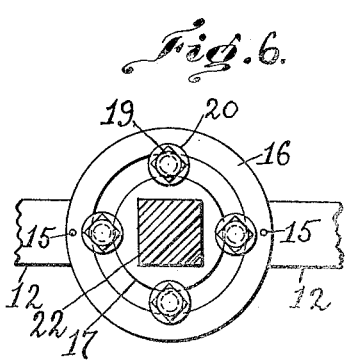
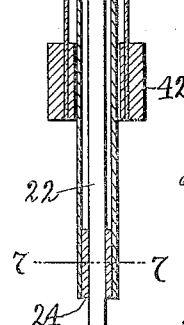
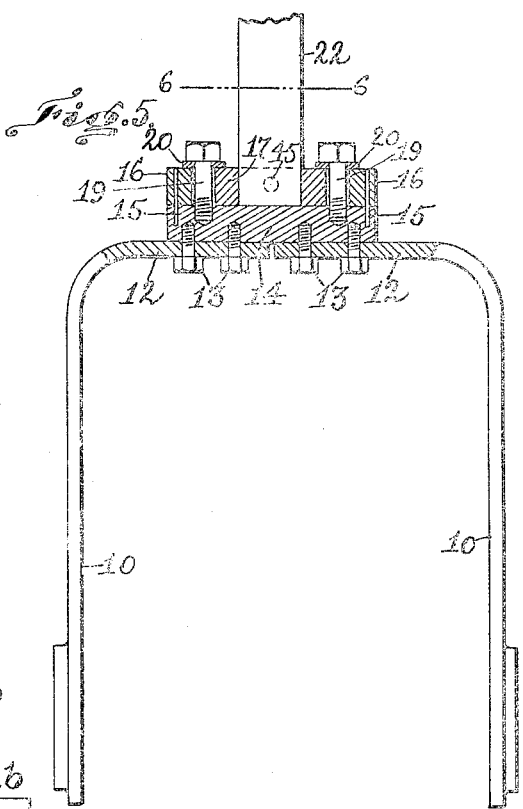
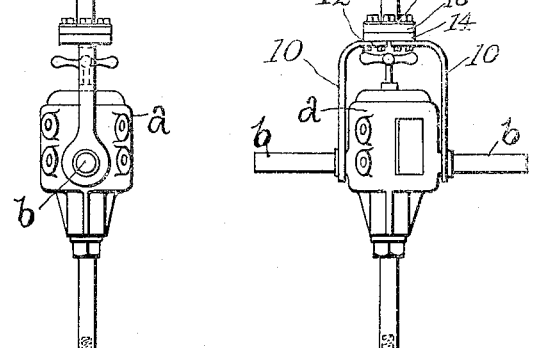
Witnesses:
Inventor:
Burt O. Gage
by Jas. H. Churchill
Atty.

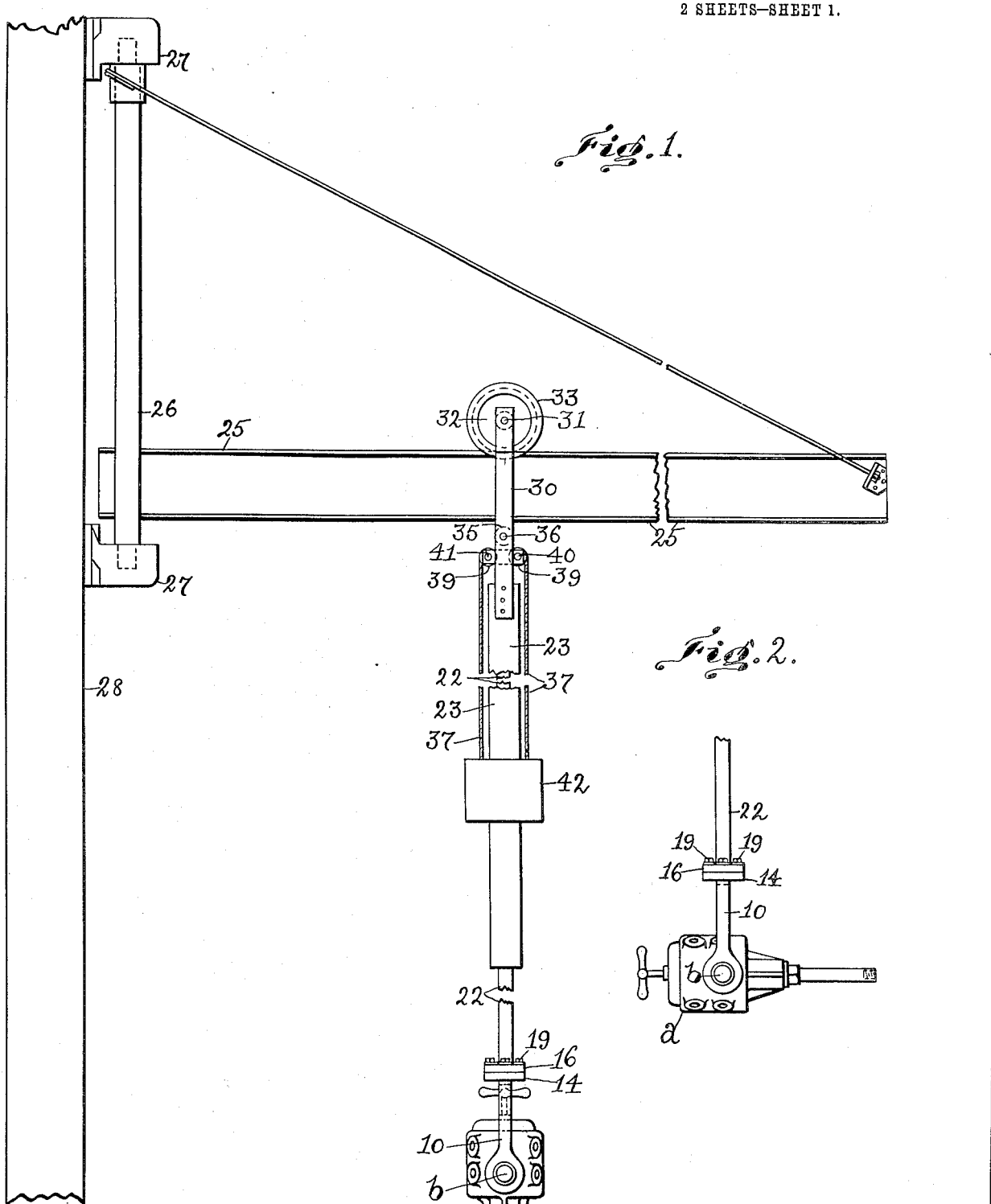

UNITED STATES PATENT OFFICE.

BURT O. GAGE, OF WARREN, MASSACHUSETTS, ASSIGNOR TO WARREN STEAM PUMP COMPANY, OF WARREN, MASSACHUSETTS, A CORPORATION OF MASSACHUSETTS.

TOOL-HOLDER FOR ROTARY DRILLING AND LIKE MACHINES.

1,131,777.  Specification of Letters Patent.  Patented Mar. 16, 1915.

Application filed January 19, 1914. Serial No. 812,921.

*To all whom it may concern:*

Be it known that I, BURT O. GAGE, a citizen of the United States, residing in Warren, in the county of Worcester and State of Massachusetts, have invented an Improvement in Tool-Holders for Rotary Drilling and like Machines, of which the following description, in connection with the accompanying drawings, in a specification, like characters on the drawings representing like parts.

This invention relates to a holder for power operated machines, and particularly for pneumatic and electrically operated machines, such as drilling, riveting and like machines.

The invention has for its object to provide a holder, which is capable of being quickly and easily moved by a single operator into different positions with relation to the work, and in the preferred embodiment of the invention, the holder has provision for permitting the tool or machine to be moved in a circular path in a horizontal plane, and for permitting the tool or machine to be operated in a vertical plane, as will be described. These and other features of this invention will be pointed out in the claims at the end of this specification.

Figure 1 is an elevation of a machine or tool provided with a holder embodying this invention. Fig. 2, an elevation of a portion of the holder shown in Fig. 1, with the machine in a horizontal position. Fig. 3, a vertical section and elevation of the holder shown in Fig. 1. Fig. 4, a side elevation of the machine and holder shown in Fig. 1 looking toward the left. Fig. 5, an enlarged detail of a part of the holder. Fig. 6, a sectional detail on the line 6—6 Fig. 5, and Fig. 7, a section on the line 7—7 Fig. 3.

Referring to the drawing *a* represents a power operated machine or tool, such for instance as a pneumatic or electric drill, riveting or like machine, of known construction, which is provided with suitable handles *b* extended from its opposite sides and by which the operator manipulates and directs the machine *a*. In accordance with this invention, the machine *a* is supported by a holder, preferably made as herein shown and comprising a lower member and an upper member connected together by a coupling capable of securing the two members together in fixed relation, and also capable of permitting the lower member to swivel or turn freely with relation to the upper member.

The lower member referred to may and preferably will be made as herein shown and consists of two vertical arms 10, provided at their lower ends with openings for the passage of the handles *b*, and having bent upper ends 12, which extend toward each other and are detachably secured as by bolts 13 to the lower side of a disk 14, which forms the lower member of a swivel coupling and has attached to its upper surface as by pins 15, a ring 16, within which is located a disk or ring 17 of sufficiently smaller diameter than the ring 14, to leave an annular space through which a plurality of bolts 19 may pass freely and enter threaded sockets in the upper surface of the disk 14.

The disk 17 and ring 16 have their upper surfaces in the same plane, so as to be engaged by washers 20 on the bolts 19 or by the heads of the bolts, if the washers are not used. The disk 17 constitutes the upper member of the swivel coupling, and is capable of being secured to the lower member in fixed relation thereto by setting up the bolts 19, and by slackening off on the said bolts, the two members of the coupling are loosely connected together, so that the lower member or disk 14, the arms 10 and the tool or machine *a* supported by said arms, may be turned in a circular path. The upper member or disk 17 has secured to it the upper member of the holder, which is preferably made as a square or other than round shank, rod or bar 22, which is vertically movable in a guiding member, shown as a metal tube 23, provided within it at its lower end with a bushing 24 having a hole of the same shape as the shank or bar 22, through which hole the said bar is movable. The upper end of the tube or guiding member 23 is connected with a supporting member, herein shown as an I-beam 25, extended horizontally from a vertical pivot 26, mounted to turn in brackets 27, attached to a vertical support 28, such as a wall, post, column or other structure.

The guiding tube 23 in the present instance is movably connected with the I-beam 25, by side bars or arms 30, which straddle the I-beam and support a shaft or pin 31 on which a roller 32 is mounted. The roller 32 bears on the top of the beam 25 and is preferably provided with flanges 33 to engage the sides of the top of the said beam. The roller 32 permits the machine holder to be moved longitudinally of the I-beam, to position the machine with relation to the work (not shown).

To facilitate movement of the holder on the beam, by preventing the tool holder from being moved too far out of its vertical position, a roller 35 is provided to engage the bottom of the beam, when the machine holder has been moved a limited inclination from the normal or vertical position. The roller 35 is located between the side bars 30, see Fig. 4, and is mounted on a pin or shaft 36 supported by said side bars. The machine holder is suspended within the guiding member or tube 23 by a cord or chain 37, which is passed through an eye bolt 38 attached to the upper end of the shank or bar 22, and over grooved pulleys 39, mounted on pins or shafts 40 supported by cross bars 41 attached to the side bars 30, and said cord or chain has its ends suitably secured to a hollow weight 42, which encircles the guiding tube 23 and moves longitudinally thereon. The weight 42 is made heavy enough to balance or substantially balance the weight of the machine and its holder, so that the machine and its holder can be easily raised and lowered by the operator, to lift the machine up away from the work or to lower it into position to engage the work. When the machine $a$ is working downward in a vertical path, the members 14, 17 of the coupling are clamped together by the bolts 19, so as to prevent the rotating tool or machine $a$ from rotating the lower member of the holder. When however the lower member of the coupling is loose, so as to permit the machine to be turned in a circular path in a horizontal plane, the rotary movement of the machine $a$ does not affect the lower member of the holder, as rotation or turning movement of the latter by the rotation of the machine, is prevented by the side arms 10 and the lower member 14 of the swivel coupling, which are not capable of being rotated or turned on the upper member 22 of the holder. The shank or bar 22 may and preferably will be inserted into a suitable socket in the disk 17, which is fastened thereto by a pin 45.

It will be understood that the machine $a$ is of known construction such as now commonly used for drilling, riveting and like operations, and that the holder herein shown is especially adapted for use with drilling machines, whose tool or drill has imparted to it a rotary motion.

When the rotary drilling machine is to be used to drill holes in a vertical direction in the work, as for instance in the ends of cylinders, the members 14, 17 of the swivel coupling are clamped together by the bolts 19, and the machine can be easily raised and lowered by the operator lifting or pulling down on the handle bars $b$. When it is desired to drill horizontal holes arranged in a circle in the work, the bolts 19 are loosened, so as to leave the lower member of the holder free to be turned in a horizontal path, in order to adjust the machine to the work, which can be effected by the operator moving the handles $b$ in a horizontal path, and, when the holder has been properly moved, the operator can then turn the handles in the arms 10, so as to elevate or depress the machine $a$ and present its tool properly to the work. The machine $a$ is of substantial weight and without the holder is difficult to handle, and frequently a number of men are required to operate a single machine, whereas with the holder herein shown, a single operator can manipulate the machine without effort, and can move it into any desired position with relation to the work in a minimum time.

One embodiment of the invention is herein shown, but it is not desired to limit the invention to the particular construction shown.

Claims:

1. In a holder of the character described, in combination, a lower member to support a machine or tool, an upper member, a coupling for connecting said members in fixed relation and also in swiveling relation, a hollow guiding member in which the said upper member is movable, a counterweight movable on the outside of said guiding member and connected with the upper member of the holder within said guiding member, and a supporting member for said guiding member on which the latter is capable of being moved, substantially as described.

2. In a holder of the character described, in combination, a lower member having arms in which a machine or tool is mounted to turn, a coupling member to which said arms are secured, an upper member angular in cross section, a coupling member to which said upper member is attached, means for securing said coupling members in fixed relation and to permit said coupling members to be connected together and allow one to turn or swivel with relation to the other, a tubular guiding member provided with an angular opening in which the upper member of the holder is movable, a counter weight movable on the tubular guiding member, and means for connecting the said counter weight with the said upper member within the guiding member.

3. In a holder of the character described, in combination, a lower member to support a machine or tool, an upper member capable of moving in the direction of its length, means for guiding said upper member in its longitudinal movement, a coupling capable of connecting said members in fixed relation and also in swiveling relation, and a counter-balance connected with said upper member to facilitate the longitudinal movement of the latter.

4. In a holder of the character described, in combination, an upper member, a guiding member for said upper member, a counter weight movable on said guiding member, and means for connecting said counter weight with said upper member, substantially as described.

5. In a holder of the character described, in combination, a substantially horizontal support, a roller movable on the upper surface thereof, a shaft on which said roller is mounted, arms straddling said support and in which said shaft is supported, a tube attached to said arms, a rod movable within said tube, a counter weight movable on said tube, and flexible connections joining the rod within the tube with the counter weight on the outside of said tube, substantially as described.

6. In a holder of the character described, in combination, a vertically movable member with which the machine or tool is connected to be supported thereby, a hollow guiding member in which said tool supporting member is movable, a counter weight movable on the outside of said guiding member, and flexible means connecting the counter weight on the outside of the said guiding member with the tool supporting member within the said guiding member.

7. In a holder of the character described, in combination, a lower member to support a machine or tool, an upper member capable of being moved in the direction of its length, means for guiding said upper member in its longitudinal movement, means for coupling said members together in swiveling relation, and means connected with said upper member for counter-balancing the weight of said machine or tool to facilitate longitudinal movement of said upper member in its guiding member.

8. In a holder of the character described, in combination, a lower member to support a machine or tool, a rigid upper member capable of moving in the direction of its length, means for guiding said rigid upper member in its longitudinal movement, means for coupling said members together in swiveling relation, and means connected with said upper member for counter-balancing the weight of said machine.

9. In a holder of the character described, in combination, a lower member, an upper member, a disk attached to one of said members, a ring attached to said disk, a disk of smaller diameter attached to the other of said members and located within said ring to form therewith an annular space, and bolts secured to the first-mentioned member in said annular space and having their heads engaged with the said disk of smaller diameter and with said ring to secure said disks in fixed relation.

In testimony whereof, I have signed my name to this specification in the presence of two subscribing witnesses.

BURT O. GAGE.

Witnesses:
H. WARD HATHAWAY,
L. G. KIBBE.